United States Patent
Yi et al.

(10) Patent No.: US 9,113,324 B2
(45) Date of Patent: Aug. 18, 2015

(54) MOBILE PRIVACY PROTECTION SYSTEM USING PROXY, PROXY DEVICE AND MOBILE PRIVACY PROTECTION METHOD

(75) Inventors: Jeong Hyun Yi, Daejeon (KR);
Taekyoung Kwon, Seoul (KR); Eunah Kim, Seoul (KR); Tae Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1293 days.

(21) Appl. No.: 12/034,081

(22) Filed: Feb. 20, 2008

(65) Prior Publication Data
US 2009/0102655 A1 Apr. 23, 2009

(30) Foreign Application Priority Data
Oct. 18, 2007 (KR) ........................ 10-2007-0105261

(51) Int. Cl.
*H04Q 5/22* (2006.01)
*H04W 12/02* (2009.01)
*H04L 29/06* (2006.01)

(52) U.S. Cl.
CPC ............. *H04W 12/02* (2013.01); *H04L 63/083* (2013.01); *H04L 63/0407* (2013.01)

(58) Field of Classification Search
CPC .......... G06K 19/0723; G06K 19/0724; G06K 19/0725; H04W 12/02; H04W 12/00; H04L 63/083; H04L 63/0407
USPC ........... 340/500, 540, 568.1, 572.1, 1.1, 10.1, 340/5.6, 5.65, 5.74, 10.51; 726/1, 3, 21; 709/225, 227; 235/380
See application file for complete search history.

(56) References Cited

U.S. PATENT DOCUMENTS

| | | | |
|---|---|---|---|
| 5,322,034 A * | 6/1994 | Willham et al. | 340/10.41 |
| 5,883,810 A | 3/1999 | Franklin et al. | |
| 7,471,199 B2 * | 12/2008 | Zimmerman et al. | 340/572.1 |
| 7,847,694 B2 * | 12/2010 | Lee et al. | 340/572.1 |
| 8,165,964 B2 * | 4/2012 | Oertel | 705/64 |
| 8,681,984 B2 * | 3/2014 | Lee et al. | 380/258 |
| 2004/0145474 A1 * | 7/2004 | Schmidtberg et al. | 340/572.1 |
| 2005/0033686 A1 | 2/2005 | Peart et al. | |
| 2006/0032917 A1 * | 2/2006 | Ritter | 235/385 |

(Continued)

FOREIGN PATENT DOCUMENTS

| | | |
|---|---|---|
| KR | 10-2007-0021877 | 2/2007 |
| WF | WO 2004/114190 A1 | 12/2004 |

(Continued)

OTHER PUBLICATIONS

Korean Office Action issued Jun. 24, 2013 in counterpart Korean Patent Application No. 10-2007-0105261 (5 pages, in Korean).

(Continued)

*Primary Examiner* — Kerri McNally
*Assistant Examiner* — An T Nguyen
(74) *Attorney, Agent, or Firm* — NSIP Law

(57) ABSTRACT

A mobile privacy protection system using a proxy, a proxy device, and a mobile privacy protection method are provided. The mobile privacy protection system includes: an electronic tag to store predetermined tag information; a proxy device to adjust a privacy level of the electronic tag; and a home server to create new tag information in response to a request from the proxy device wherein the new tag information is used to adjust the privacy level.

26 Claims, 10 Drawing Sheets

(56) References Cited

U.S. PATENT DOCUMENTS

| | | |
|---|---|---|
| 2006/0033608 A1* | 2/2006 | Juels et al. .................. 340/10.1 |
| 2007/0040654 A1* | 2/2007 | Lee et al. .................... 340/10.1 |
| 2007/0044094 A1* | 2/2007 | Banerjee ...................... 717/176 |
| 2007/0046432 A1* | 3/2007 | Aiouaz et al. ................ 340/10.1 |
| 2007/0194889 A1* | 8/2007 | Bailey et al. ............... 340/10.51 |
| 2008/0001724 A1* | 1/2008 | Soleimani et al. ......... 340/10.51 |
| 2008/0001725 A1* | 1/2008 | White et al. ............... 340/10.51 |
| 2008/0094220 A1* | 4/2008 | Foley et al. ................ 340/572.4 |
| 2008/0157927 A1* | 7/2008 | Soppera et al. .............. 340/10.1 |
| 2008/0165005 A1* | 7/2008 | Burbridge et al. ......... 340/572.1 |
| 2008/0170695 A1* | 7/2008 | Adler et al. .................. 380/277 |

FOREIGN PATENT DOCUMENTS

| | | |
|---|---|---|
| WO | WO 2004/114190 | 12/2004 |
| WO | 2006/009040 A1 | 1/2006 |
| WO | WO 2006/009040 | 1/2006 |

OTHER PUBLICATIONS

Rieback, Melanie R., et al. "A platform for RFID security and privacy administration." USENIX LISA. 2006. (14 pages)

* cited by examiner

MOBILE PRIVACY PROTECTION SYSTEM USING PROXY, PROXY DEVICE AND MOBILE PRIVACY PROTECTION METHOD

CROSS-REFERENCE TO RELATED APPLICATION

This application claims the benefit of Korean Patent Application No. 2007-105261, filed on Oct. 18, 2007 in the Korean Intellectual Property Office, the disclosure of which is incorporated herein by reference.

BACKGROUND OF THE INVENTION

1. Field of the Invention

Aspects of the present invention relate to a mobile privacy protection system using a proxy, a proxy device, and a mobile privacy protection method.

2. Description of the Related Art

A personal area network (PAN) refers to a communication network to process necessary information using a portable information terminal. A PAN is smaller than a local area network (LAN), and includes a system which transmit/receives various information using a personal information terminal or system which uses saltwater of human body as a conductor to exchange information easily. In the system using saltwater as a conductor, an electric signal of a card computer is transmitted to another card computer by shaking hands. For another example, a PAN can be configured using a radio frequency identification (RFID).

An RFID system is a system which wirelessly receives/transmits various kinds of data using a particular frequency band. A magnetic strip, barcode, and the like are easily damaged and a recognition performance is gradually deteriorated. However, an RFID system can overcome the above-described disadvantages. Accordingly, an RFID system is replacing an existing barcode and magnetic card market, and is the fastest growing segment in security services, time cards, parking, and physical distribution management fields.

FIG. 1 illustrates an example of a conventional RFID communication model.

The RFID system described above generally includes a tag 101, a reader 102, and a back-end database 103. In this instance, a communication environment between the reader 102 and the back-end database 103 can be a secure channel 104, and a communication environment between the reader 102 and the tag 101 can be an insecure channel 105.

Due to the feature of RFID, the electronic tag of the RFID system replies to queries from all readers.

SUMMARY OF THE INVENTION

Aspects of the present invention provide a mobile privacy protection system and method that can adjust a privacy level to enable an electronic tag to selectively reply to a query of another reader, and a proxy device that is used in the system and method.

Other aspects of the present invention also provide a mobile privacy protection system and method in which a user alone can adjust a privacy level, and a proxy device that is used in the system and method.

Additional aspects of the present invention also provide a mobile privacy protection system that can flexibly correspond to an exceptional situation such as loss or absence of a proxy device, a disabled home server, and the like using an exceptional situation processing function, and a proxy device that is used in the system and the method.

According to an aspect of the present invention, there is provided a mobile privacy protection system including: an electronic tag to store predetermined tag information; a proxy device to adjust a privacy level of the electronic tag; and a home server to create new tag information in response to a request from the proxy device wherein the new tag information is used to adjust the privacy level.

In an aspect of the present invention, the proxy device may receive from the electronic tag a portion of tag information or complete tag information, and transmit to the home server the received portion of tag information or the received complete tag information. The portion of tag information or the complete tag information may include an electronic product code (EPC) of the electronic tag. The home server may search an electronic product code information service (EPCIS) for product information corresponding to the EPC. When the product information is found, the home server may receive the product information and a password of the electronic tag, and register the electronic tag.

In an aspect of the present invention, the home server may transmit to the proxy device a portion of tag information or complete tag information of the registered electronic tag. The proxy device may register the received portion of tag information or the received complete tag information. The portion of tag information or the complete tag information may include a password of the electronic tag, and the proxy device may rename the electronic tag using the password according to the privacy level.

In an aspect of the present invention, the renaming may include a process of updating the tag information of the electronic tag with the new tag information that is created in the home server. The proxy device may convert the electronic tag to an unlocked state using a registered password to thereby update the new tag information and then convert the electronic tag to a locked state using a password included in the new tag information.

According to another aspect of the present invention, there is provided a proxy device including: a register to register an electronic tag in a home server; and a privacy level adjustment unit to adjust a privacy level of the electronic tag.

According to still another aspect of the present invention, there is provided a mobile privacy protection method including: registering an electronic tag in a home server; and setting a privacy level of the electronic tag.

New aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
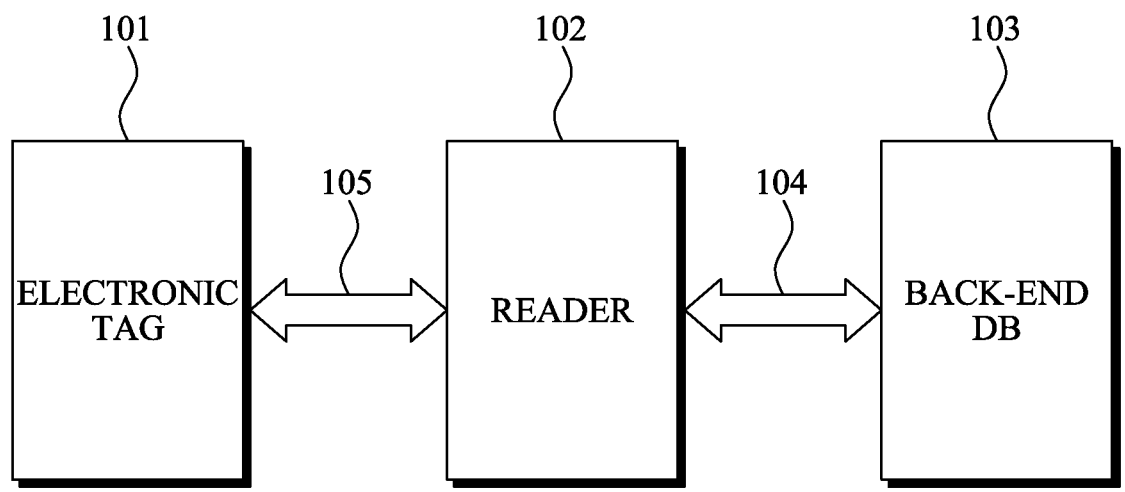
FIG. 1 is a block diagram illustrating an RFID communication model according to a conventional art.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

Figure 2:
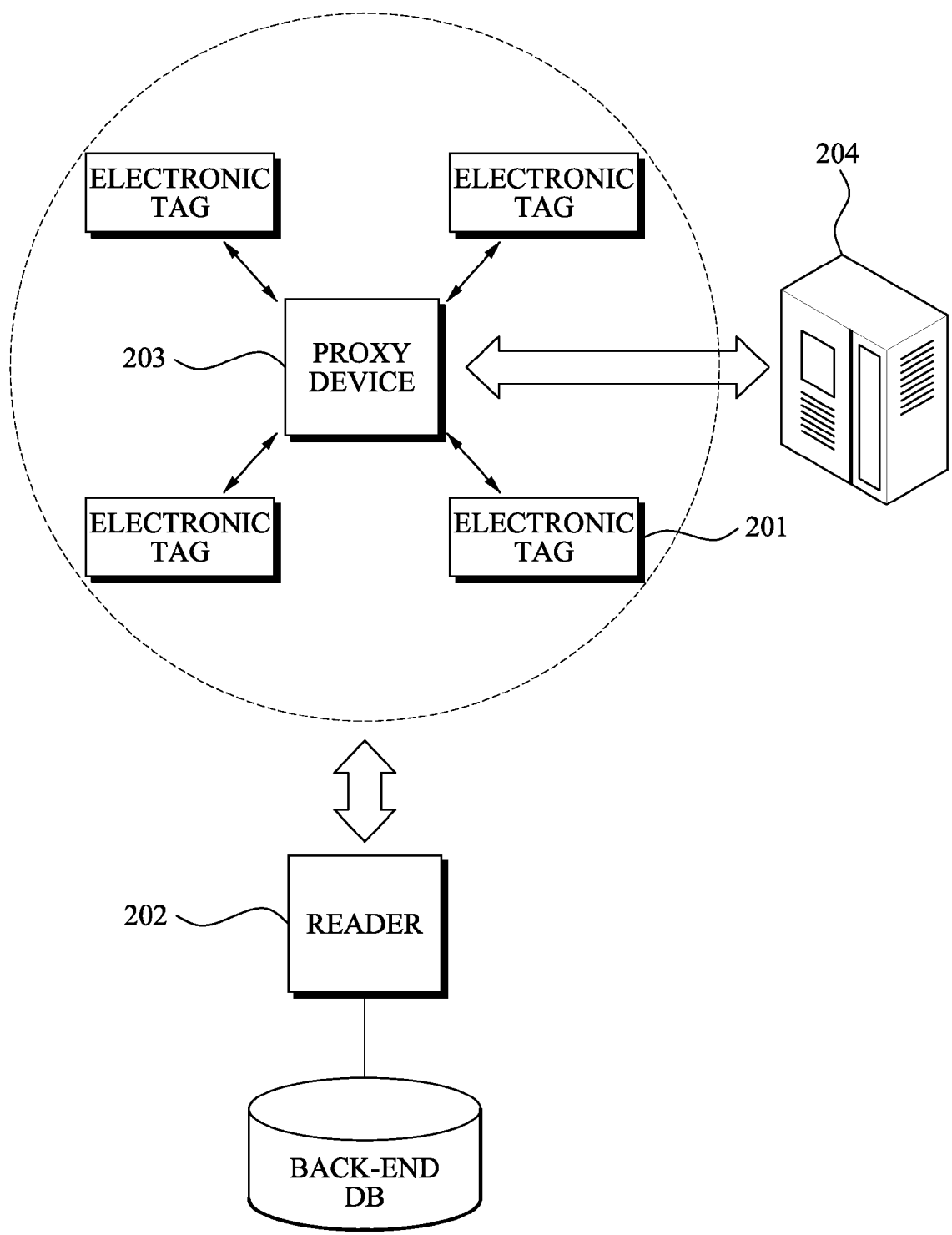
FIG. 2 illustrates a mobile privacy protection system according to an aspect of the present invention.

FIG. 2 illustrates a mobile privacy protection system according to an aspect of the present invention.

Due to the feature of Radio Frequency Identification (RFID), an electronic tag of an RFID system replies to queries from all readers. For example, when a reader 202 requests an electronic tag 201 for information, the electronic tag 201 transmits requested information to the reader 202. Even though the electronic tag 201 includes private information, the electronic tag 201 replies to a query and thus the private information may be exposed. In this case, privacy may be infringed or illicitly tracked.

Each electronic tag needs to selectively reply to queries from other readers. According to an aspect of the present invention, the mobile privacy protection system uses a proxy device 203. The electronic tag 201 may selectively reply to a query from the reader 202 and adjust a privacy level using the proxy device 203 that can adjust the privacy level. The proxy device 203 may be connected to a home server 204 via an authenticated secure channel. In interoperation with the connected home server 204, the proxy device 203 may rename the electronic tag 201 or convert a state of the electronic tag 201 using a sleep password and a wakeup password and thereby control the electronic tag 201 to reply to only an authorized reader.

Figure 3:
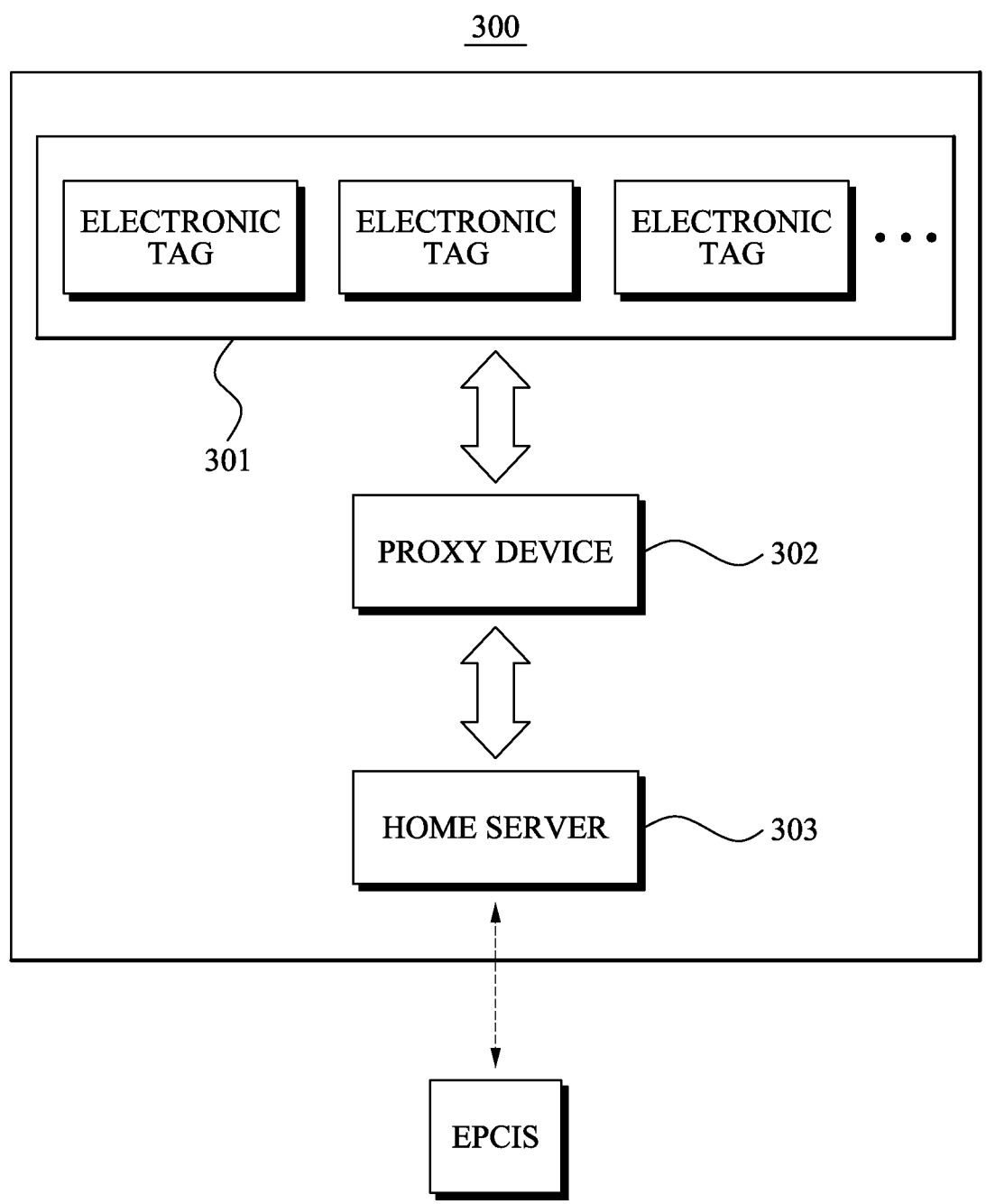
FIG. 3 is a block diagram illustrating an internal configuration of a mobile privacy protection system according to an aspect of the present invention.

FIG. 3 is a block diagram illustrating an internal configuration of a mobile privacy protection system 300 according to an aspect of the present invention. As shown in FIG. 3, the mobile privacy protection system 300 may include at least one electronic tag 301, a proxy device 302, and a home server 303.

The at least one electronic tag 301 stores predetermined tag information. The electronic tag 301 may include four memory regions, an electronic product code (EPC) memory region, a tag identifier (TID) memory region, a reserved memory region, and a user memory region.

The EPC memory regions include an EPC. The EPC may be a new product number standard that assigns a unique serial number to each product. Specifically, the EPC is a code embedded in the electronic tag 301. Types of versions based on a bit size of the EPC include EPC-64, EPC-96, EPC-256, and the like. EPC-96 includes an eight-bit version header, a 28-bit EAN.UCC manufacturer number, a 24-bit product number including a Global Trade Item Number (GTIN), and a 36-bit serial number for a total of 96 bits. The version header classifies a code type. The EPC is provided in response to a query from a reader. A RFID system may receive the EPC using the reader and obtain detailed information about a product with the electronic tag 301 attached.

The TID memory region includes a TID. The TID may be an identifier of the electronic tag 301.

The reserved memory region may include an access password to access the electronic tag 301 and a kill password to terminate the electronic tag 301. When the electronic tag 301 is in a locked state, the reader may perform only a read operation in the EPC memory region. When the electronic tag 301 is in an unlocked state, the reader may perform read and write operations in all four memory regions. Accordingly, the reader needs the access password to perform the read or write operation in three memory regions excluding the EPC memory region.

The above-described electronic tag 301 according to an aspect of the present invention is based on a general electronic tag that is used in the RFID system. However, this is only an example for convenience of description and thus the present invention is not limited thereto. It will be understood to those of ordinary skill in the art that various modifications and changes may be made. For example, the electronic tag 301 may include a first memory region where the read operation is allowed at all times and a second memory region where the read operation is allowed only when using the access password. In this case, the first memory region may include the EPC and the TID, and the second memory region may include the access password and the kill password.

Whether the electronic tag 301 is in a sleep state may be determined based on a predetermined signal that is transmitted from the proxy device 302 according to the privacy level. When the electronic tag 301 is in the sleep state, the electronic tag 301 may not reply to other signals excluding the predetermined signal. Specifically, the electronic tag 301 may reply to only the predetermined signal. The state and the state transition of the electronic tag 301 will be further described in detail with reference to FIG. 7.

The proxy device 302 adjusts the privacy level of the electronic tag 301. For the above operation, the proxy device 302 must register the initial electronic tag 301 in the home server 303. In order to register the electronic tag 301, the proxy device 302 may receive a portion of tag information or complete tag information, and transmit the received information to the home server 303 in response to a query for the electronic tag 301. The portion of tag information or complete tag information may include the EPC of the electronic tag 301. Transmitting the EPC to the home server 303 is for registering the electronic tag 301 in the home server 303 and obtaining the access password and the kill password of the electronic tag 301. For the above operation, the home server 303 must reach an electronic product information service (EPCIS) in a secure manner. Specifically, the home server 303 may securely reach the EPCIS using a conditionally traceable authentication method for protection of the user privacy.

The home server 303 may transmit to the proxy device 302 a given level and the password of the electronic tag 301 that is obtained from the EPCIS. The proxy device 302 may register and store the given level and the password in association with the electronic tag 301. The given level may be predetermined while manufacturing the electronic tag 301, or may be automatically determined through a privacy policy designation in the home server 303. When the given level is predetermined in the manufacture of the electronic tag 301, the home server 303 may obtain the given level from the EPCIS.

The privacy level may include an n-step level to determine a state or operation of the electronic tag 301. The n-step level may include at least one level of a first level that is assigned in the manufacture of the electronic tag 301, a second level that permits only an access of an authenticated reader, a third level that temporarily suspends a reply to an external signal, and a fourth level that temporarily suspends the reply and a function of the proxy device 302. The proxy device 302 may be set to a desired level by manipulation of a button by the user. The n-step level may be set by a combination of the given level and the desired level. For example, the proxy device 302 may use as the privacy level a greater level between the given level and the desired level.

The desired level may be set based on a length of time a predetermined button that is included in the proxy device 302 is pushed, or a number of times the button is pushed. For example, the desired level may be changed based on the length of time that the user is pushing the button, or every time the user pushes the button.

When the electronic tag 301 is registered, the proxy device 302 performs renaming once regardless of the determined privacy level. This is to protect the privacy of the user using the electronic tag 301. The proxy device 302 may monitor communication between the electronic tag 301 and a reader based on the privacy level, and may log a communication message, or may communicate with the reader instead of the electronic tag 301.

The proxy device 302 may rename the electronic tag 301 according to the privacy level. The renaming may include a process of updating the tag information of the electronic tag 301 with the new tag information that is created in the home server 303. The proxy device 302 may convert the electronic tag 301 from a locked state to an unlocked state using a registered password and update the new tag information. Also, the proxy device 302 may again convert the electronic tag 301 from the unlocked state to the locked state using a password that is included in the new tag information.

Specifically, since the proxy device 302 unlocks the electronic tag 301 using the password of the registered electronic tag 301 to convert the electronic tag 301 to the unlocked state, a write operation in the memory region of the electronic tag 301 may be enabled. When updating of the new tag information is completed, the electronic tag 301 is locked again using the password included in the new tag information. Therefore, it is possible to control a reach of a different reader.

The proxy device 302 may transmit to the electronic tag 301 a sleep password or a wakeup password that is a predetermined signal based on the privacy level. The sleep password or the wakeup password converts the state of the electronic tag 301. The state transition of the electronic tag 301 will be further described in detail with reference to FIG. 7.

As described above, in response to the request from the device proxy 302, the home server 303 creates new tag information that is used to adjust the privacy level, and transmits the created new tag information to the proxy device 302. For processing synchronization with the EPCIS and an exceptional situation such as loss or absence of the proxy device 302, the home server 303 may compute a hash value with respect to a portion of or complete new tag information and transmit the computed hash value to the EPCIS. The synchronization and processing of the exceptional situation will be further described in detail with reference to FIG. 6.

Figure 4:
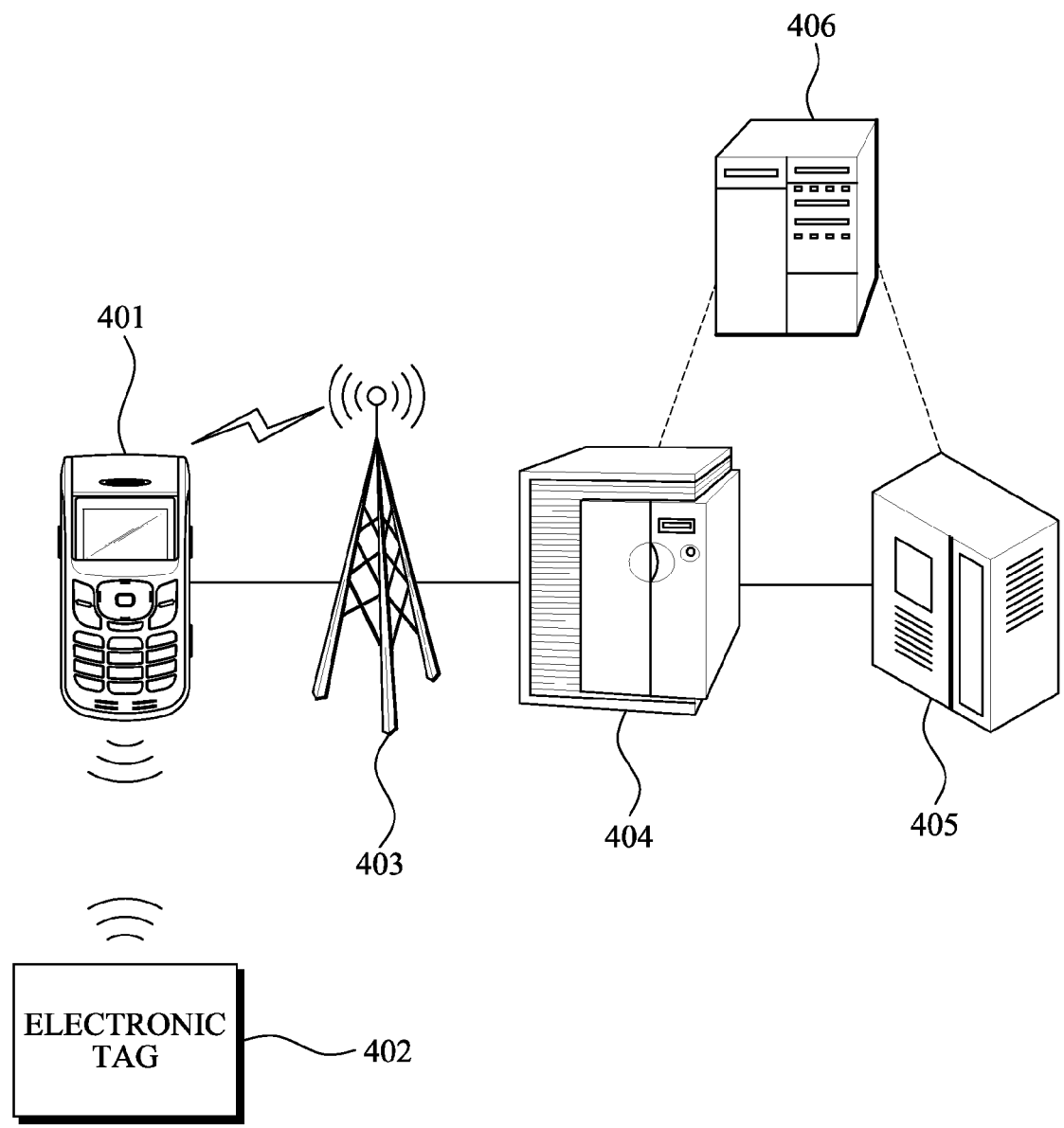
FIG. 4 illustrates a method of registering an electronic tag according to an aspect of the present invention.

FIG. 4 illustrates a method of registering an electronic tag 402 according to an aspect of the present invention.

A proxy device 401 may receive information from the electronic tag 402 that the proxy device 401 desires to register, and transmit the received information to a home server 404 via a mobile infrastructure 403. The information includes an EPC. An authenticated secure channel for data transmission may be established between the proxy device 401 and the home server 404.

The home server 404 may access a corresponding EPCIS 405 using the EPC. The home server 404 may use an object name service (ONS) server 406 to find the EPCIS 405. Specifically, the home server 404 may access the ONS server 406 using the EPC and obtain an address of the EPCIS 405. The home server 404 may access the EPCIS 405 using the obtained address, and obtain product information of a product with the electronic tag 402 attached and receive a password of the electronic tag 402. The home server 404 must reach the EPCIS 405 in a secure manner. Specifically, the home server 404 may securely reach the EPCIS 405 using a conditionally traceable anonymous authentication method for protection of the user privacy.

The home server 404 may classify and register the product based on the product information received from the EPCIS 405. The home server 404 may automatically set the given level through the privacy policy designation and transmit the set given level and the password to the proxy device 401. The given level may be determined when the electronic tag 402 is manufactured. In this case, the home server 404 may receive the given level from the EPCIS 405 and transmit the given level to the proxy device 401.

The proxy device 401 may complete the registration of the electronic tag 402 by registering and storing the given level received from the home server 404 and the password of the electronic tag 402.

Figure 5:
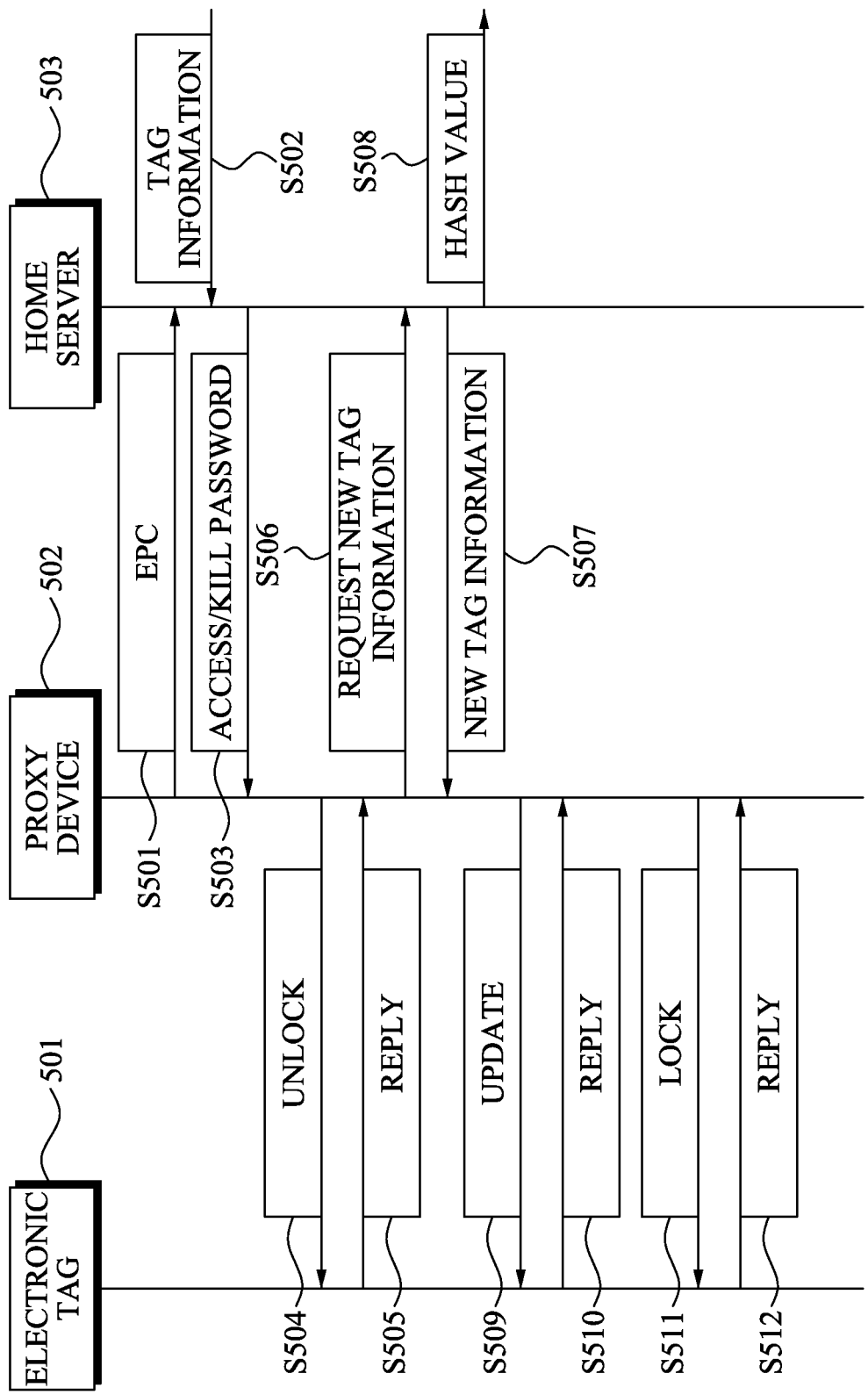
FIG. 5 illustrates a method of renaming an electronic tag according to an aspect of the present invention.

FIG. 5 illustrates a method of renaming an electronic tag 501 according to an aspect of the present invention. In FIG. 5, when setting a privacy level, data are transmitted and received among the electronic tag 501, a proxy device 502, and a home server 503.

In operation S501, the proxy device 502 transmits an EPC to the home server 503. The EPC may be obtained from a reply to a query that is transmitted from the proxy device 502 to the electronic tag 501 (not shown).

In operation S502, the home server 503 receives tag information corresponding to the EPC from an EPCIS. The tag information includes a password of the electronic tag 501. The home server 503 must reach the EPCIS in a secure manner. Specifically, the home server 503 may securely reach the EPCIS using a conditionally traceable anonymous authentication method for protection of the user privacy. Also, the tag information may further include a given level that is assigned in the manufacture of the electronic tag 501.

In operation S503, the home server 503 transmits an access/kill password of the electronic tag 501 to the proxy device 502. The home server 503 may transmit the password and the given level together. Operations S501 through S503 are for obtaining, by the proxy device 502, the password of the electronic tag 501 and may be performed only when renaming the electronic tag 501 for the first time.

In operation S504, the proxy device 502 unlocks the electronic tag 501 using the password. Specifically, the electronic tag 501 is in the unlocked state and may perform a write operation in a memory region. In operation S505, in response to an unlock signal, the electronic tag 501 replies to the proxy device 502 that the electronic tag 501 is in the unlocked state. In operation S506, the proxy device 502 requests the home server 503 for new tag information. In operation S507, the home server 503 transmits the new tag information to the proxy device 502 in response to the request. The new tag information may include an updated EPC, the access password, and the kill password.

In operation S509, the proxy device 502 that received the new tag information updates the tag information of the electronic tag 501 with the new tag information. In operation S510, the electronic tag 501 replies to the proxy device regarding successful updating. In operation S511, the proxy device 502 locks the electronic tag 501 to convert the electronic tag 501 to a locked state using a password that is included in the new tag information. In operation S512, the electronic tag 501 replies to the proxy device 502 that the electronic tag 501 is in the locked state. The renaming of the electronic tag 501 is complete with the completion of operation S512.

Figure 6:
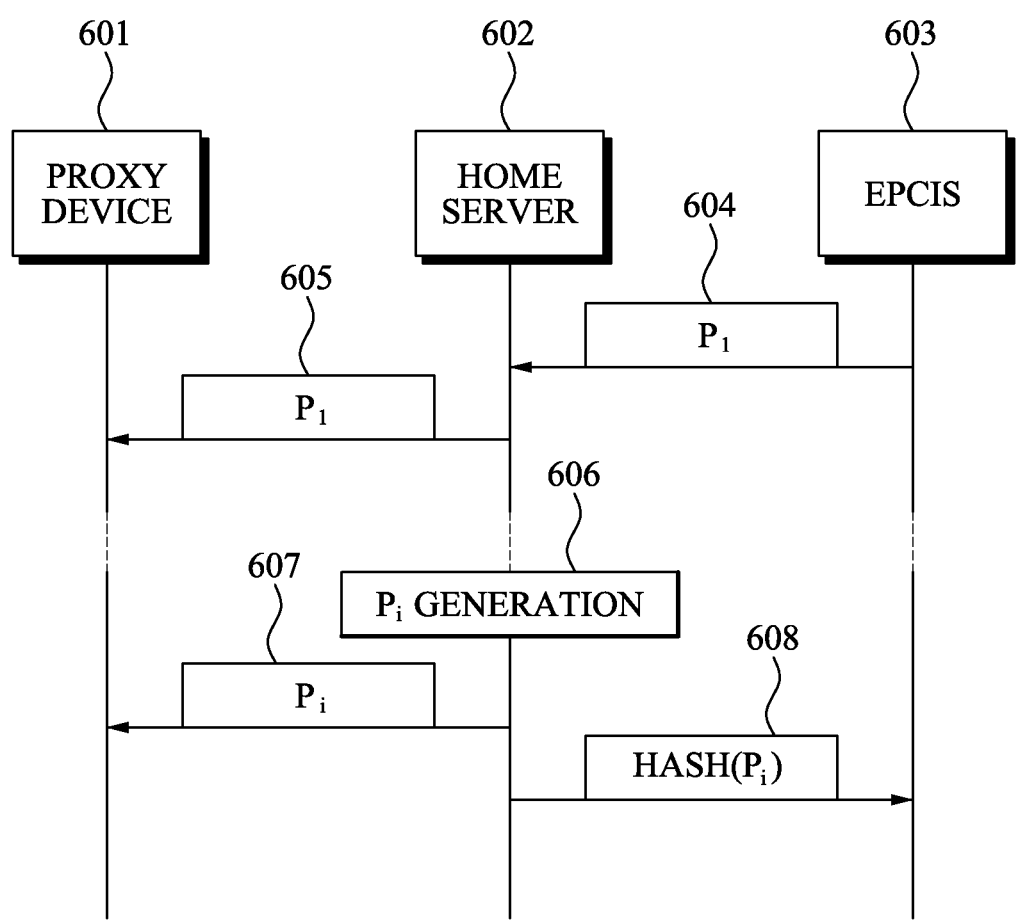
FIG. 6 illustrates a synchronization with an electronic product code information service (EPCIS) and processing of an exceptional situation according to an aspect of the present invention.

FIG. 6 illustrates a synchronization with an EPCIS 603 and processing an exceptional situation according to an aspect of the present invention. Referring to FIG. 6, a hash value is used to perform the synchronization and process the exceptional situation among a proxy device 601, a home server 602, and the EPCIS 603.

When initially registering an electronic tag, the home server 602 receives an initial password $P_1$ from the EPCIS 603 in operation 604 and transmits the initial password $P_1$ to the proxy device 601 in operation 605. The home server 602 creates a new password Pi in operation 606 every time the electronic tag is renamed and transmits the created new password Pi to the proxy device 601 in operation 607. The home server 602 computes a hash value of the new password Pi and transmits the hash value to the EPCIS 603 in operation 608.

The EPCIS 603 may store the hash value in association with an existing password and perform synchronization with the new password Pi that is created in the home server 602. The EPCIS 603 stores the hash value. Therefore, even though an attacker attacks the EPCIS 603 and succeeds in exposing the hash value, it is possible to prevent the leakage of the actual secret value. Also, in the case of occurrence of the exceptional situation such as loss or absence of the proxy device, a disabled home server 602, and the like, it is possible to flexibly correspond to the exceptional situation by using the hash value as a verification value for a secret value of a corresponding party.

When the user loses the proxy device 601, the home server 602 may authenticate a user accessing with a device of an authorized place or an authorized device. The home server 602 may continuously synchronize a password by updating a portion of tag information or complete tag information, or updating a hash value corresponding thereto in the EPCIS 603. In the case of the absence of the proxy device 601, the user may access the home server 602 using the device of the authorized place or the authorized device, and be authenticated. The home server 602 may transmit the portion of tag information or the complete tag information to the device of the authorized place or the authorized device, so that the user may adjust a privacy level of the electronic tag even in the case of the absence of the proxy device 601.

When a user of the electronic tag is changed, the home server 602 may receive from the proxy device 601 the portion of tag information or the complete tag information, and inform the EPCIS 613 of the change of the user using a hash value corresponding to the portion of tag information or the complete tag information. The EPCIS 603 may update the tag information and transmit the updated tag information to a home server of the changed user, and transmit the portion of tag information or the complete tag information to a new proxy device. Through the above operation, the new proxy device may register the electronic tag.

Figure 7:
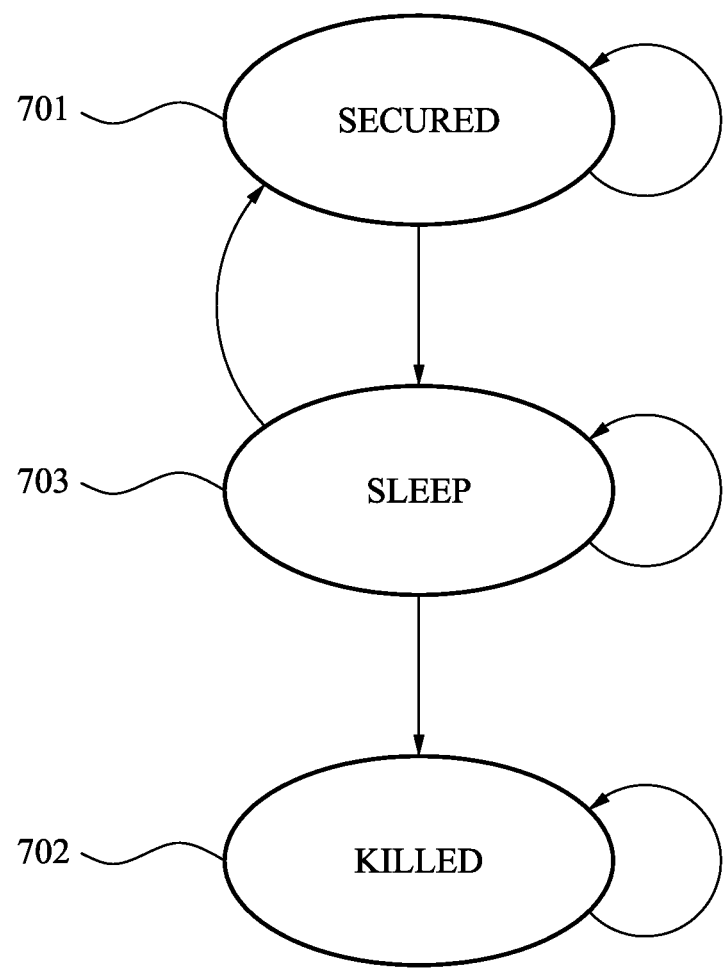
FIG. 7 illustrates a state transition of an electronic tag according to an aspect of the present invention.

FIG. 7 illustrates a state transition of an electronic tag according to an aspect of the present invention. Referring to FIG. 7, the electronic tag may include a 'secured' state 701, a 'killed' state 702, and a 'sleep' state 703.

Specifically, the electronic tag may be converted from the secured state 701 to the sleep state 703 by a sleep password that is a predetermined signal transmitted from a proxy device. Also, the electronic tag may be converted from the sleep state 703 to the secured state 701 by a wakeup password. The electronic tag in the sleep state 703 replies to only the wakeup password or a kill password.

The electronic tag may be converted from the secured state 701 or the sleep state 703 to the killed state 702 by the kill password that is the predetermined signal transmitted from the proxy device. The electronic tag in the killed state 702 does not reply to any signal. Specifically, when not using the electronic tag any more, the kill password may be used.

As described above, when using the mobile privacy protection system according to an aspect of the present invention, it is possible to adjust a privacy level so that an electronic tag may selectively reply to a query from another reader. A user alone may adjust the privacy level. It is also possible to flexibly correspond to an exceptional situation, such as loss or absence of a proxy device, using an exception situation processing function.

Figure 8:
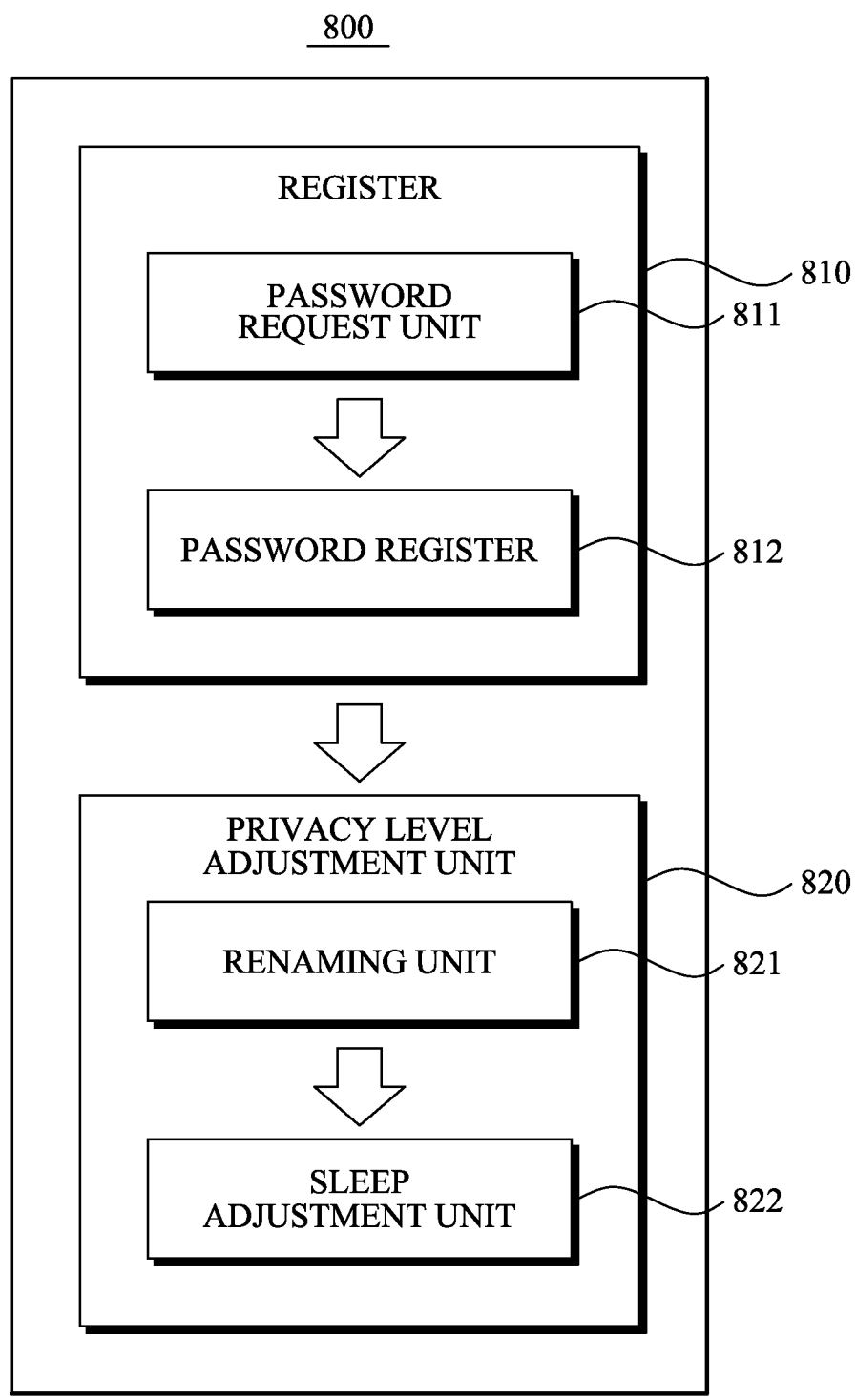
FIG. 8 is a block diagram illustrating an internal configuration of a proxy device according to an aspect of the present invention.

FIG. 8 is a block diagram illustrating an internal configuration of a proxy device 800 according to an aspect of the present invention. Referring to FIG. 8, the proxy device 800 may include a register 810 and a privacy level adjustment unit 820.

The register 810 registers an electronic tag in a home server. The register 810 may transmit to the home server an EPC that is received from the electronic tag, and receive a password of the electronic tag from the home server. For the above operation, the register 810 may include a password request unit 811 and a password register 812.

The password request unit 811 requests the home server for a password of the electronic tag based on the EPC that is received from the electronic tag. According to an aspect of the present invention, the home server may access an ONS server using the EPC and obtain an address of an EPCIS corresponding to the EPC. The home server may access the EPCIS using the obtained address and obtain product information of a product with the electronic tag attached and receive an access password and a kill password as a password of the electronic tag. The home server must reach the EPCIS in a secure manner. Specifically, the home server may securely reach the EPCIS using a conditionally traceable anonymous authentication method for protection of the user privacy.

When a given level assigned in the manufacture of the electronic tag is included in the EPCIS, the home server may further receive the given level. Conversely, when the given level is not included in the EPCIS, the home server may automatically set the given level through a privacy policy designation. The home server transmits to the proxy device information that includes both the password and the given level.

The password register 812 registers and stores the information received from the home server. As described above, the information includes the password and the given level. The given level may be used to set a privacy level by a combination with a desired level. The desired level is set by manipulation of a button by a user. The password may be used for renaming the electronic tag.

The privacy level adjustment unit 820 adjusts the privacy level of the electronic tag. As described above, the privacy level may be set by the combination of the given level received from the home server and the desired level. The privacy level adjustment unit 820 may set the privacy level.

The privacy level adjustment unit 820 may rename the electronic tag or convert the state of the electronic tag according to the privacy level. For the above operation, the privacy level adjustment unit 820 may include a renaming unit 821 and a sleep adjustment unit 822 as shown in FIG. 8.

The renaming unit 821 renames the electronic tag. The renaming may include a process of updating the tag information of the electronic tag with the new tag information that is created in the home server. The renaming unit 821 will be further described in detail with reference to FIG. 9.

The sleep adjustment unit 822 determines whether the electronic tag is in a sleep state. Specifically, the sleep adjustment unit 822 may convert the electronic tag to the sleep state, or may convert the electronic tag from the sleep state to either a secured state or a killed state.

Figure 9:
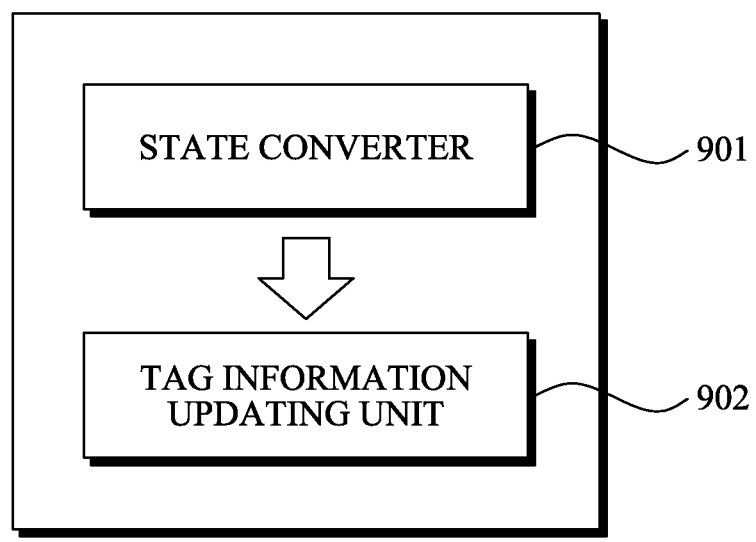
FIG. 9 is a block diagram illustrating an internal configuration of a renaming unit of FIG. 8.

FIG. 9 is a block diagram illustrating an internal configuration of the renaming unit 821 of FIG. 8. Referring to FIG. 9, the renaming unit 821 may include a state converter 901 and a tag information updating unit 902.

The state converter 901 converts the electronic tag to either a locked state or an unlocked state using a password of the electronic tag. According to an aspect of the present invention, the state converter 901 may convert the electronic tag to the unlocked state based on a first password and convert the electronic tag to the locked state based on a second password. The first password is registered when registering the electronic tag and the second password is included in the new tag information received from the home server.

The tag information updating unit 902 receives the new tag information that is created in the home server and updates the tag information of the electronic tag. Specifically, when the state converter 901 converts the state of the electronic tag to the unlocked state, the tag information updating unit 902 updates the tag information of the electronic tag with the new tag information and the state converter 601 again converts the state of the electronic tag to the locked state. Through the above operation, the renaming process is completed. The renaming process may be automatically performed without user interference for each protocol session.

Figure 10:
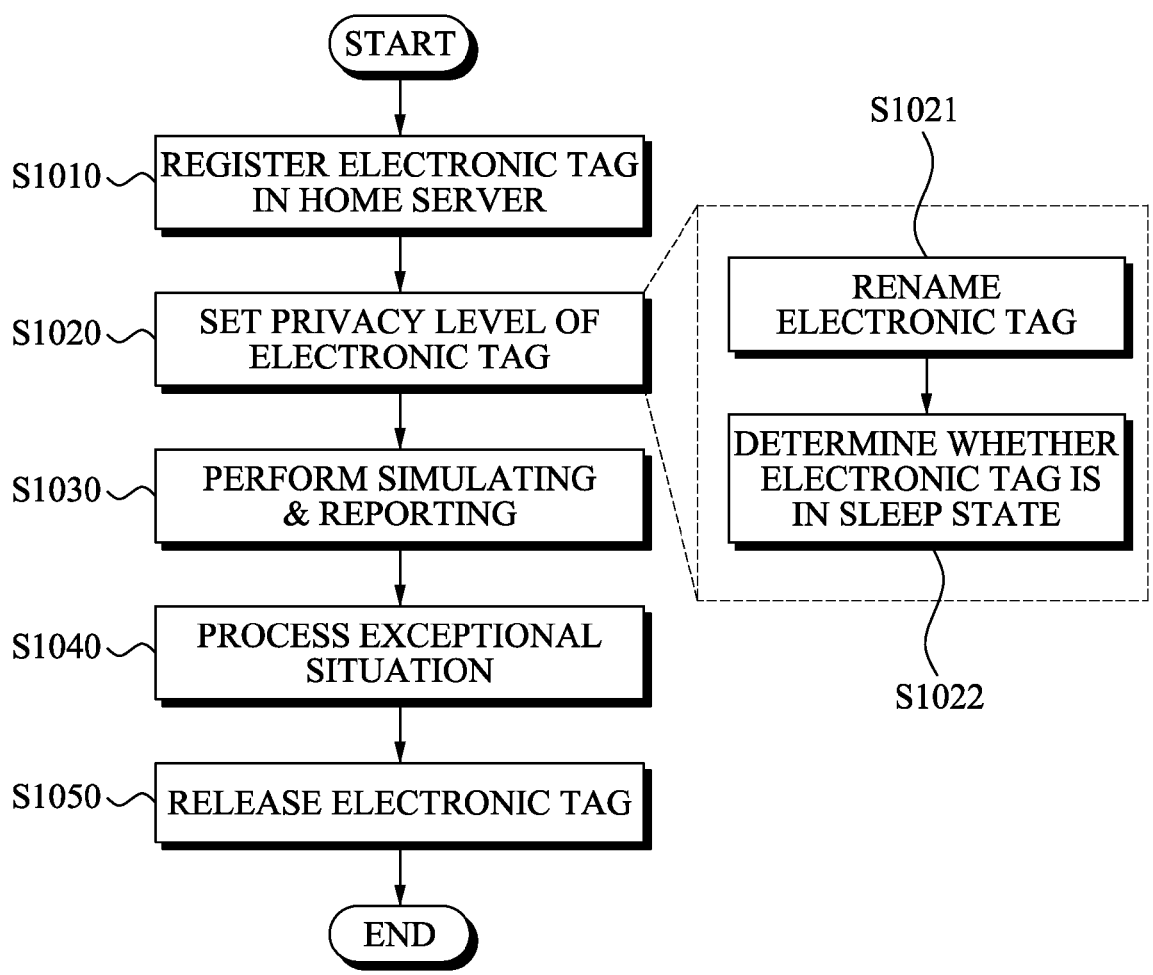
FIG. 10 is a flowchart illustrating a mobile privacy protection method according to an aspect of the present invention.

FIG. 10 is a flowchart illustrating a mobile privacy protection method according to an aspect of the present invention.

In operation S1010, a proxy device registers an electronic tag in a home server. The electronic tag includes predetermined tag information. Whether the electronic tag is in a sleep state may be determined based on a predetermine signal that is transmitted from the proxy device based on a privacy level. The electronic tag in the sleep state does not reply to other signals except for the predetermined signal. Specifically, the electronic tag 301 may reply to only the predetermined signal.

The proxy device adjusts the privacy level of the electronic tag. For the above operation, the proxy device must register the initial electronic tag in the home server. In order to register the electronic tag, the proxy device may receive a portion of tag information or complete tag information and transmit the received information to the home server in response to a query for the electronic tag. The portion of tag information or the complete tag information may include an EPC of the electronic tag. Transmitting the EPC to the home server is for registering the electronic tag in the home server and obtaining an access password and a kill password of the electronic tag.

The home server may transmit to the proxy device a given level and the password of the electronic tag that is obtained from an EPCIS. The proxy device may register and store the received given level and the password in association with the electronic tag. The given level may be predetermined when the electronic tag is manufactured, or may be automatically determined through a privacy policy designation in the home server. When the given level is predetermined when the electronic tag is manufactured, the home server may obtain the given level from the EPCIS.

In operation S1020, the proxy device sets the privacy level of the electronic tag. The privacy level may include an n-step level to determine a state or an operation of the electronic tag. The n-step level may include at least one level of a first level that is assigned when the electronic tag is manufactured, a second level that permits only an access of an authenticated reader, a third level that temporarily suspends a reply to an external signal, and a fourth level that temporarily suspends the reply and a function of the proxy device.

The proxy device may be set to a desired level by a button manipulation of the user. The n-step level may be set by a combination of the given level and the desired level. For example, the proxy device may use a greater level between the given level and the desired level as the privacy level.

The desired level may be set based on a length of time a predetermined button that is included in the proxy device is pushed, or a number of times the button is pushed. For example, the desired level may be changed based on the length of time that the user is pushing the button, or every time the user pushes the button.

The proxy device may rename the electronic tag, or determine whether the electronic tag is in a sleep state according to the privacy level. For the above operation, operations S1021 and S1022 of FIG. 10 may be included in operation S1020. Whether to perform operations S1021 and S1022 may be determined based on the privacy level of the electronic tag.

In operation S1021, the proxy device renames the electronic tag. The renaming may include a process of updating the tag information of the electronic tag with the new tag information that is created in the home server. For the renaming of the electronic tag, the proxy device may convert the electronic tag to an unlocked state using a registered first password and update the tag information of the electronic tag with the new tag information received from the home server. After this, the proxy device may again convert the electronic tag to the locked state using a second password. The second password includes the new tag information. As shown in FIG. 5, a home server may compute a hash value with respect to a portion of tag information or complete new tag information and transmit the computed hash value to an EPCIS for synchronization of the password, in S508.

In operation S1022, the proxy device determines whether the electronic tag is in the sleep state. Specifically, the home server may convert the state of the electronic state to the sleep state, or may convert the electronic state from the sleep state to either a secured state or a killed state.

In operation S1030, the proxy device simulates communication between a reader and the electronic tag, and reports the simulated communication. Whether to perform simulating and reporting may be determined based on the privacy level. For example, when the privacy level is greater than a predetermined level, the proxy device may perform simulating by communicating with the reader instead of the electronic tag. When the privacy level is less than the predetermined level, the proxy device may perform reporting by monitoring and logging the communication between the electronic tag and the reader.

In operation S1040, the home server processes an exceptional situation such as loss or absence of the proxy device, change of a user, and the like. When the user loses the proxy device, the home server may authenticate a user accessing a device of an authorized place or an authorized device. The home server may continuously synchronize a password by updating a portion of tag information or complete tag information, or updating a hash value corresponding thereto in the EPCIS.

In the case of the absence of the proxy device, the user may access the home server using the device of the authorized place or the authorized device, and be authenticated. The home server may transmit the portion of tag information or the complete tag information to the device of the authorized place or the authorized device, so that the user may adjust the privacy level of the electronic tag even in the case of the absence of the proxy device.

When the user of the electronic tag is changed, the home server may receive from the proxy device the portion of tag information or the complete tag information, and inform the EPCIS of the change of the user using a hash value corresponding to the portion of tag information or the complete tag information. The EPCIS may update the tag information and transmit the updated tag information to a home server of the changed user, and transmit the portion of tag information or the complete tag information to a new proxy device. Through the above operation, the new proxy device may register the electronic tag.

In operation S1050, the proxy device releases the electronic tag. Specifically, the proxy device may release the electronic tag by transmitting the kill password to the electronic tag and converting the electronic tag to the killed state.

Aspects of the present invention can also be embodied as computer-readable codes on a computer-readable recording medium and can be realized in a common digital computer executing the program using a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment and an encryption source code segment (such as data transmission through the Internet). The computer-readable recording medium can also be distributed over network coupled computer systems so that the computer-readable code is stored and executed in a distributed fashion. Moreover, the hard disk drive can be used with a computer, can be a portable drive, and/or can be used with a media player.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A mobile privacy protection system comprising:
an electronic tag to store predetermined tag information;
a proxy device to adjust a privacy level of the electronic tag between a locked state and an unlocked state; and
a home server to create new tag information in response to a request from the proxy device wherein the new tag information is used to adjust the privacy level,
wherein the proxy device is further configured to rename the electronic tag based on the adjusted privacy level, the privacy level comprises an n-step level to determine a state or operation of the electronic tag, and the n-step level is set by a comparison as the more secure of a desired level and a given level where the desired level is set by a user of the proxy device and the given level is automatically determined through a privacy policy designation in the home server.

2. The system as claimed in claim 1, wherein the proxy device receives from the electronic tag a portion of tag information or complete tag information, and transmits to the home server the received portion of tag information or the received complete tag information.

3. The system as claimed in claim 2, wherein the portion of tag information or the complete tag information comprises an electronic product code (EPC) of the electronic tag, and
the home server searches an electronic product code information service (EPCIS) for product information corresponding to the EPC, and when the product information is found, the home server receives the product information and a password of the electronic tag, and registers the electronic tag.

4. The system as claimed in claim 2, wherein the home server transmits to the proxy device the portion of tag information or the complete tag information of the registered electronic tag, and
the proxy device registers the received portion of tag information or the received complete tag information.

5. The system as claimed in claim 4, wherein the portion of tag information or the complete tag information comprises a password of the electronic tag.

6. The system as claimed in claim 5, wherein the renaming comprises a process of updating the tag information of the electronic tag with the new tag information that is created in the home server, and
the proxy device converts the electronic tag to the unlocked state using a registered password to thereby update the new tag information and then convert the electronic tag to the locked state using a password included in the new tag information.

7. The system as claimed in claim 1, wherein the home server computes a hash value with respect to a portion of tag information or complete new tag information to verify a password in processing a password synchronization and an exceptional situation, and transmits the computed hash value to an EPCIS.

8. The system as claimed in claim 1, wherein the n-step level comprises a first level that is assigned in the manufacture of the electronic tag, a second level that permits only an access of an authenticated reader, a third level that temporarily stops a reply to an external signal, and a fourth level that temporarily stops the reply and a function of the proxy device.

9. The system as claimed in claim 8, wherein the desired level is set based on a length of time a predetermined button that is included in the proxy device is pushed, or a number of pushes on the button.

10. The system as claimed in claim 1, wherein the proxy device monitors communication between the electronic tag and a reader based on the privacy level, or the proxy device communicates with the reader instead of the electronic tag.

11. The system as claimed in claim 1, wherein whether the electronic tag is in a sleep state is determined based on a predetermined signal that is transmitted from the proxy device based on the privacy level, and
the electronic tag in the sleep state replies to only the predetermined signal.

12. The system as claimed in claim 1, wherein when a user accesses with a device of an authorized place or an authorized device is authenticated, the home server performs at least one of updating a portion of tag information or complete tag information and a hash value corresponding thereto in an EPCIS, and transmitting the portion of tag information or the complete tag information to the device of the authorized place or the authorized device.

13. The system as claimed in claim 1, wherein when tag information of the electronic tag is changed, the home server receives from the proxy device a portion of the changed tag information or complete changed tag information, and informs an EPCIS of the change of the tag information using a hash value corresponding to the portion of the changed tag information or the complete changed tag information, and the EPCIS updates the tag information and transmits the updated tag information to a proxy device of a changed user.

14. A proxy device comprising:
a register to register an electronic tag in a home server; and
a privacy level adjustment unit to adjust a privacy level of the electronic tag between a locked state and an unlocked state and to rename the electronic tag based on the adjusted privacy level,
wherein the privacy level comprises an n-step level to determine a state or operation of the electronic tag, and the n-step level is set by a comparison as the more secure of a desired level and a given level where the desired level is set by a user of the proxy device and the given level is automatically determined through a privacy policy designation in the home server.

15. The proxy device as claimed in claim 14, wherein the register comprises:
a password request unit to request the home server for a password of the electronic tag based on an EPC that is received from the electronic tag; and
a password register to register the password in association with the electronic tag, and
the home server searches an EPCIS for tag information corresponding to the EPC, and when the tag information is found, the home server registers the electronic tag.

16. The proxy device as claimed in claim 14, wherein the privacy level adjustment unit comprises:
a renaming unit to rename the electronic tag; and
a sleep adjustment unit to determine whether the electronic tag is in a sleep state.

17. The proxy device as claimed in claim 16, wherein the renaming comprises a process of updating tag information of the electronic tag to new tag information that is created in the home server, and
the renaming unit comprises:
a state converter to convert a state of the electronic tag to either the locked state or the unlocked state using a password of the electronic tag; and
a tag information updating unit to receive the new tag information that is created in the home server and update the tag information of the electronic tag.

18. The proxy device as claimed in claim 17, wherein the state converter converts the electronic tag to the unlocked state based on a first password and converts the electronic tag to the locked state based on a second password, the first password is registered when registering the electronic tag and the second password is included in the new tag information received from the home server.

19. A mobile privacy protection method comprising:
registering an electronic tag in a home server;
adjusting a privacy level of the electronic tag between a locked state and an unlocked state; and
renaming the electronic tag based on the adjusted privacy level,
wherein the privacy level comprises an n-step level to determine a state or operation of the electronic tag, and the n-step level is set by a comparison as the more secure of a desired level and a given level where the desired level is set by a user of the proxy device and the given level is automatically determined through a privacy policy designation in the home server.

20. The method as claimed in claim 19, wherein the registering comprises:
requesting the home server for a password of the electronic tag based on an EPC that is received from the electronic tag; and
registering the password in association with the electronic tag.

21. The method as claimed in claim 20, wherein the home server searches an EPCIS for tag information corresponding to the EPC and when the tag information is found, the home server registers the tag information.

22. The method as claimed in claim 19, wherein the adjusting comprises determining whether the electronic tag is in a sleep state.

23. The method as claimed in claim 19, wherein the renaming comprises:
converting the electronic tag to the unlocked state using a registered first password;
updating tag information of the electronic tag to new tag information that is received from the home server; and
converting the electronic tag to the locked state using a second password that is included in the new tag information.

24. A non-transitory computer-readable recording medium storing a program to implement a mobile privacy protection method comprising:
registering an electronic tag in a home server;
adjusting a privacy level of the electronic tag between a locked state and an unlocked state; and
renaming the electronic tag based on the adjusted privacy level,
wherein the privacy level comprises an n-step level to determine a state or operation of the electronic tag, and the n-step level is set by a comparison as the more secure of a desired level and a given level where the desired level is set by a user of the proxy device and the given level is automatically determined through a privacy policy designation in the home server.

25. The system of claim 1, wherein the proxy device adjusts the privacy level of the electronic tag to one level from among n-step levels used to determine a state or operation of the electronic tag.

26. The system of claim 25, wherein the n-step levels comprise a first level that is assigned during the manufacture of the electronic tag, a second level that permits only an access of an authenticated reader, a third level that temporarily suspends a reply to an external signal, and a fourth level that temporarily suspends the reply and a function of the proxy device.

* * * * *